(12) United States Patent
Henderson et al.

(10) Patent No.: US 11,050,364 B2
(45) Date of Patent: Jun. 29, 2021

(54) SEMI-RESONANT MOTION DEVICES AND METHODS THEREOF

(71) Applicant: New Scale Technologies, Inc., Victor, NY (US)

(72) Inventors: David A. Henderson, Farmington, NY (US); Qin Xu, Pittsford, NY (US); Daniele Piazza, Pittsford, NY (US); Eric Walkama, Fairport, NY (US)

(73) Assignee: NEW SCALE TECHNOLOGIES, INC., Victor, NY (US)

( * ) Notice: Subject to any disclaimer, the term of this patent is extended or adjusted under 35 U.S.C. 154(b) by 576 days.

(21) Appl. No.: 15/836,386

(22) Filed: Dec. 8, 2017

(65) Prior Publication Data

US 2018/0183356 A1    Jun. 28, 2018

Related U.S. Application Data

(60) Provisional application No. 62/432,227, filed on Dec. 9, 2016.

(51) Int. Cl.
*H02N 2/02* (2006.01)
*H02N 2/00* (2006.01)
*H02N 2/10* (2006.01)

(52) U.S. Cl.
CPC ............. *H02N 2/025* (2013.01); *H02N 2/008* (2013.01); *H02N 2/0015* (2013.01); *H02N 2/026* (2013.01); *H02N 2/103* (2013.01)

(58) Field of Classification Search
CPC combination set(s) only.
See application file for complete search history.

(56) References Cited

U.S. PATENT DOCUMENTS

| | | | |
|---|---|---|---|
| 7,786,648 B2 | 8/2010 | Xu et al. | |
| 8,279,541 B2 | 10/2012 | Henderson et al. | |
| 8,299,733 B2 | 10/2012 | Sattler et al. | |
| 8,304,960 B2 | 11/2012 | Sattler et al. | |
| 8,450,905 B2 | 5/2013 | Guidarelli et al. | |
| 8,698,374 B2 | 4/2014 | Xu et al. | |
| 2001/0030490 A1 | 10/2001 | Wajima et al. | |
| 2005/0258711 A1* | 11/2005 | Funakubo | H01L 41/0913 310/323.16 |
| 2006/0175932 A1 | 8/2006 | Danell et al. | |

(Continued)

FOREIGN PATENT DOCUMENTS

| EP | 0 220 959 B1 | 5/1987 |
|---|---|---|
| EP | 2327114 B1 | 9/2015 |

OTHER PUBLICATIONS

International Search Report for PCT/US17/65363, dated Feb. 14, 2018, pp. 1-9.

*Primary Examiner* — Bryan P Gordon
(74) *Attorney, Agent, or Firm* — Troutman Pepper Hamilton Sanders LLP (Rochester)

(57) ABSTRACT

A semi-resonant actuator assembly includes a resonating body comprising a piezoelectric plate having a first length, a first width, and a first thickness, and an inactive plate having a second length substantially equal the first length, a second width substantially equal to the first width, and second thickness. A thickness of the resonating body is provided by a sum of the first thickness of the active piezoelectric plate and the second thickness of the inactive plate.

16 Claims, 14 Drawing Sheets

(56) References Cited

U.S. PATENT DOCUMENTS

| | | | |
|---|---|---|---|
| 2009/0224631 A1* | 9/2009 | Mukae | H02N 2/026 310/323.16 |
| 2009/0224718 A1* | 9/2009 | Honjo | H02N 2/062 318/672 |
| 2010/0038996 A1* | 2/2010 | Xu | H02N 2/065 310/323.16 |
| 2011/0101895 A1* | 5/2011 | Sattler | H02N 2/067 318/116 |
| 2011/0156536 A1* | 6/2011 | Adachi | H01L 41/083 310/323.02 |

* cited by examiner

SEMI-RESONANT MOTION DEVICES AND METHODS THEREOF

This application claims the benefit of U.S. Provisional Patent Application Ser. No. 62/432,227, filed Dec. 9, 2016, which is hereby incorporated by reference in its entirety.

FIELD

The present technology relates to semi-resonant motion devices and methods for piezoelectric ultrasonic motors that use friction to generate linear or rotary motion.

BACKGROUND

Transducers using piezoelectric technologies are used for precise positioning at the nanometer scale. Typically, piezoelectric devices include a ceramic that is formed into a capacitor that changes shape when charged and discharged.

Ultrasonic motion systems use piezoelectric transducers to generate small amplitude vibrations, typically at mechanical resonances using friction contact. Vibrations are applied to a moveable surface and the net friction force causes that surface to rotate or translate at distances much greater than the vibration amplitude and at significant velocity and with significant torque or force. The direction of movement is controlled by changing the direction of the vibrations. This actuator principle is now applied to numerous ultrasonic motor embodiments.

SUMMARY

A semi-resonant actuator assembly includes a resonating body comprising a piezoelectric plate having a first length, a first width, and a first thickness, and an inactive plate having a second length substantially equal the first length, a second width substantially equal to the first width, and a second thickness. A thickness of the resonating body is provided by a sum of the first thickness of the active piezoelectric plate and the second thickness of the inactive plate.

A semi-resonant actuator device includes a semi-resonant actuator assembly comprising a resonating body comprising a piezoelectric plate having a first length, a first width, and a first thickness, and an inactive plate having a second length substantially equal the first length, a second width substantially equal to the first width, and a second thickness. A thickness of the resonating body is provided by a sum of the first thickness of the active piezoelectric plate and the second thickness of the inactive plate. A two-phase drive circuit is operably coupled to the piezoelectric plate of the semi-resonant actuator assembly.

A semi-resonant motion system includes a semi-resonant actuator assembly comprising a resonating body comprising a piezoelectric plate having a first length, a first width, and a first thickness, and an inactive plate having a second length substantially equal the first length, a second width substantially equal to the first width, and a second thickness. A thickness of the resonating body is provided by a sum of the first thickness of the active piezoelectric plate and the second thickness of the inactive plate. A two-phase drive circuit is operably coupled to the piezoelectric plate of the semi-resonant actuator assembly. A flexible printed circuit board is operably coupled to electrodes of the piezoelectric plate of the semi-resonant actuator assembly and the two-phase drive circuit. A preload spring is positioned to support the semi-resonant actuator assembly. At least one movable body is positioned between the semi-resonant actuator assembly and the at least one moveable body. The preload spring provides a clamping force between the semi-resonant actuator assembly and the at least one movable body and frictionally connects the semi-resonant actuator assembly to the at least one moveable body.

The present technology provides several advantages for semi-resonant motion devices that include improvements in manufacturability and efficiency.

DETAILED DESCRIPTION

Figure 1A:
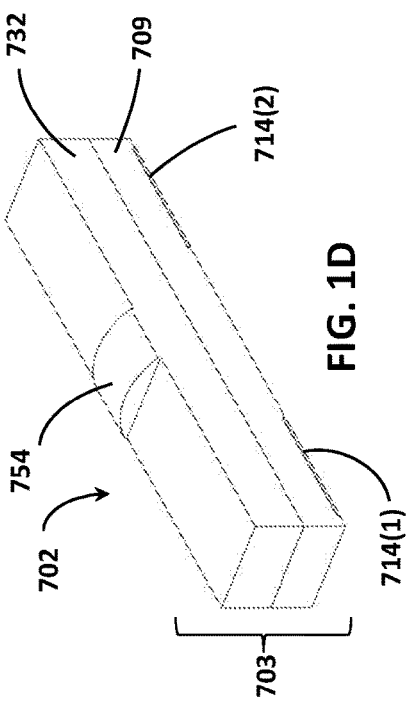
FIG. 1A is a back view of the semi-resonant actuator assembly.

FIGS. 1-4 illustrate a semi-resonant actuator assembly 702 and semi-resonant actuator device 704. Referring more specifically to FIGS. 1A-1E, in one example, the actuator assembly 702 is a substantially elongated rectangular and monolithic structure 703, which has two different resonant frequencies for the two orthogonal first bending modes. The operating principle of this actuator is more fully described in U.S. Pat. No. 7,786,648, which is hereby incorporated by reference herein in its entirety. By way of example, the operating principle is described with particular reference to the embodiment shown in FIGS. 17A-17B and FIG. 18A-18B in U.S. Pat. No. 7,786,648. The present technology provides a number of advantages including providing semi-resonant motion devices that are easier to manufacture and are more efficient.

The substantially elongated rectangular and monolithic structure 703 comprises a piezoelectric plate 709 and an inactive plate 732. In this example, the piezoelectric plate 709 and the inactive plate 732 have substantially the same length and width, although the substantially elongated rectangular and monolithic structure 703 may include other types and numbers of elements or components in other configurations.

Figure 1B:
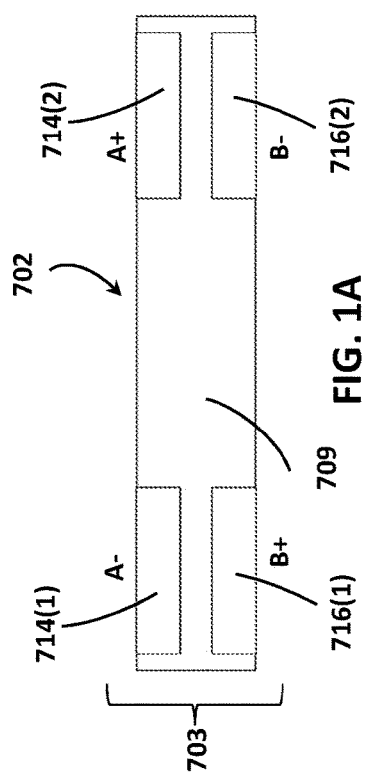
FIG. 1B is a side view of the semi-resonant actuator assembly illustrated in FIG. 1A.
Figure 1C:
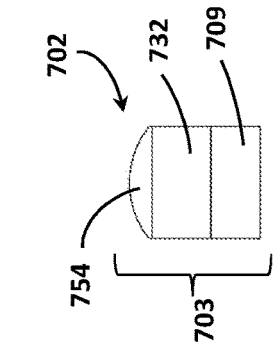
FIG. 1C is an end view of the semi-resonant actuator assembly illustrated in FIG. 1A.
Figure 1D:
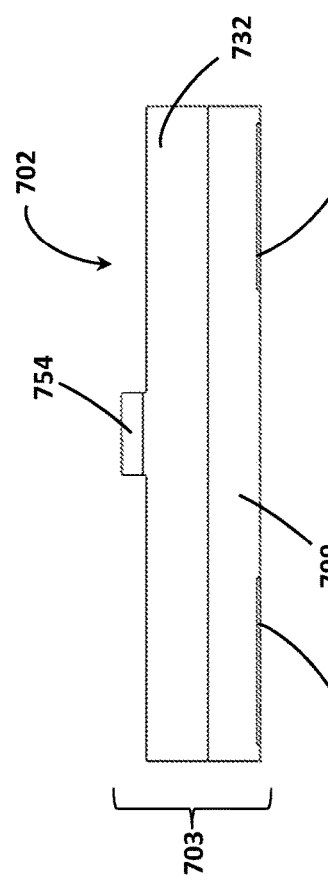
FIG. 1D is a perspective view of the semi-resonant actuator assembly illustrated in FIG. 1A.
Figure 1E:
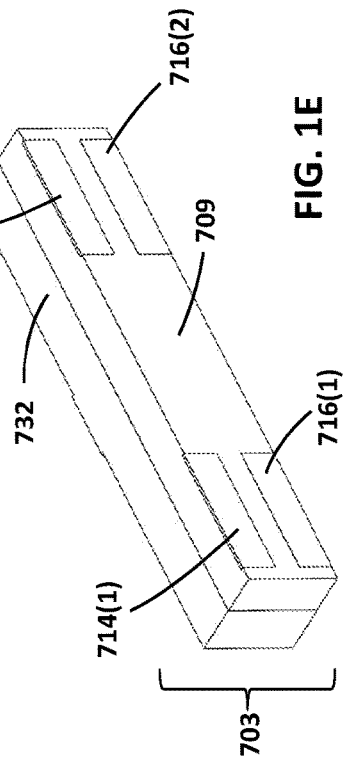
FIG. 1E is another perspective view of the actuator embodiment illustrated in FIG. 1A.

The piezoelectric plate 709 has two active regions A and B, as shown in FIG. 1A, and has internal electrodes as described in U.S. Pat. No. 7,786,648, the disclosure of which is incorporated by reference herein. The internal electrodes (not shown) are coupled to the outer electrodes 714(1), 714(2), 716(1) and 716(2), as illustrated in FIG. 1A, by way of example. A frictional bump 754 is located at the anti-node plane at the mid-point of the longest length of the substantially elongated rectangular and monolithic structure 703, as illustrated in FIG. 1B. The frictional bump 754 is part of the inactive plate 732 and is located on the opposite side of the substantially elongated rectangular and monolithic structure 703 with respect to the outer electrodes 714(1), 714(2), 716(1) and 716(2), although other configurations may be contemplated.

In this example, the manufacturing process for forming the piezoelectric plate 709 is simplified by making the shape a simple rectangular plate. In this example, inactive plate 732 is made of hardened stainless steel and is bonded to the piezoelectric plate 709, although inactive plates of other materials may be utilized. In this example, the frictional bump 754 is an integral part of the inactive plate 709, although in other examples the frictional bump 754 may be a separate piece bonded to the inactive plate. Although an example configuration is described, it is possible to make the semi-resonant actuator assembly 702 in other ways using different materials.

In another example, the inactive plate 732 can be formed from a piezoelectric ceramic material which is co-fired with the active piezoelectric plate 709 to from a single component. In this example, the frictional bump 754 is then bonded on to the surface of the inactive plate 732 using an adhesive material. The frictional bump 754 can be made of variety of materials including metals, ceramic, and plastics, by way of example only. The frictional bump 754 can have various shapes, such as cylindrical, spherical, or elliptical shapes, by way of example only.

Figure 2:
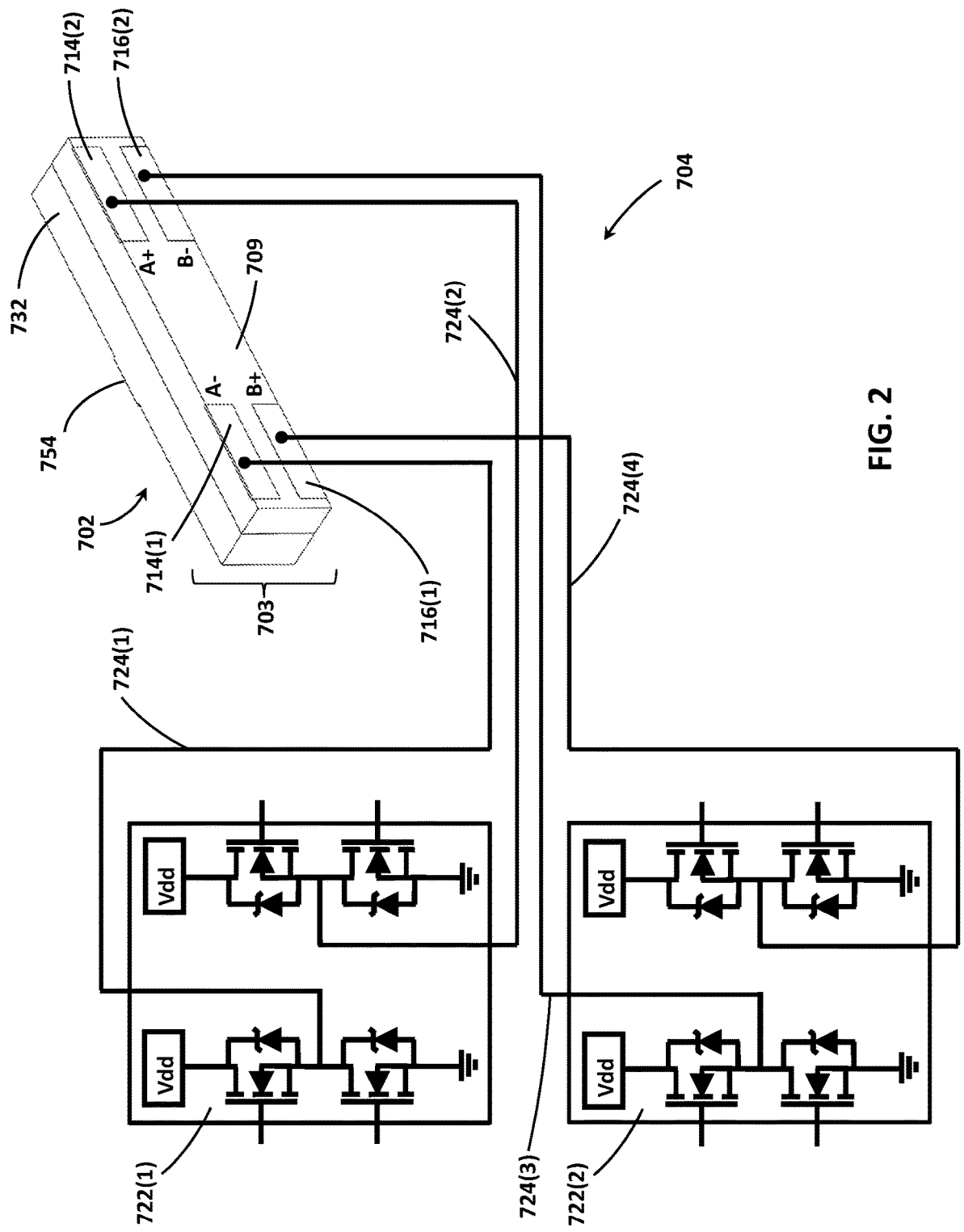
FIG. 2 is a schematic diagram for an actuator device that uses the actuator assembly illustrated in FIGS. 1A-1E.

Referring now more specifically to FIG. 2, the semi-resonant actuator device 704 includes the semi-resonant actuator assembly 702 integrated with two-phase full-bridge switching drive electronics 722(1) and 722(2), although the semi-resonant actuator assembly 702 may be integrated with other types and/or numbers of components and/or devices, including by way of example only, other electronics. Both active regions A and B of the piezoelectric plate 709, as shown in FIG. 2, are energized and the switch timing, phase shift, and amplitude are independently controlled by the full-bridge switching drive electronics 722(1) and 722(2) to provide optimum actuator performance.

Figure 3:
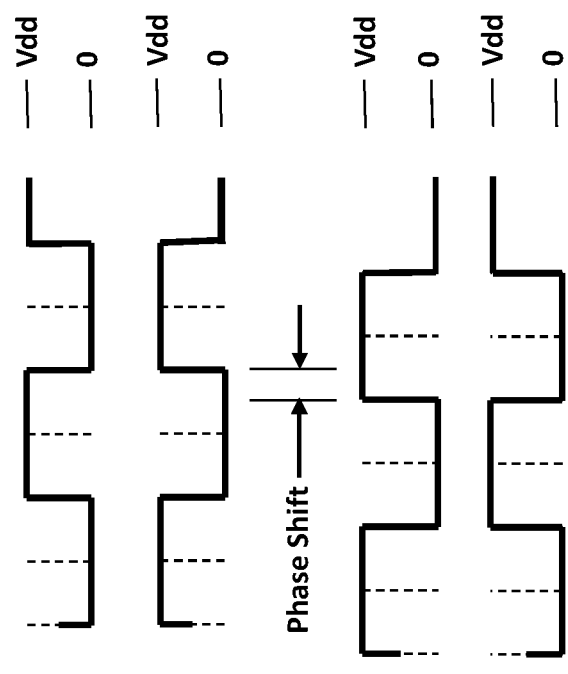
FIG. 3 is a diagram of the driving signals generated by the drive electronics illustrated in FIG. 2.
Figure 3:
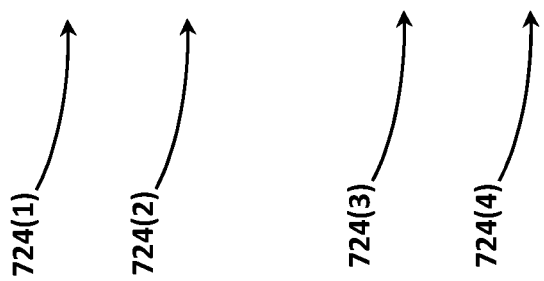

Referring now more specifically to FIG. 2 and FIG. 3, in one example, the full-bridge switching drive electronics 722(1) and 722(2) provide four drive signals 724(1)-724(4) from the outputs of the full-bridge switching drive electronics 722(1) and 722(2), which are coupled to external electrodes 714(1), 714(2), 716(1), and 716(2) of the piezoelectric plate 709, respectively. By way of example, the full-bridge switching drive electronics 722(1) and 722(1) provide a voltage value (Vdd) to the external electrodes 714(1), 714(2), 716(1), and 716(2). In this example, Vdd is 2.8 volts, however other voltage values may be utilized. Referring to FIG. 3, the four drive signals 724(1)-724(4) have substantially the same frequency as the resonant frequency of one of the two bending modes of the substantially elongated rectangular and monolithic structure 703.

Additionally, the drive signals 724(1) and 724(2) that are output to the external electrodes 714(1) and 714(2) are phase shifted by the semi-resonant actuator device 704 with respect to the drive signals 724(3)-724(4) output to the external electrodes 716(1) and 716(2) by substantially +90 degrees to −90 degrees to change the direction of motion of the semi-resonant actuator device 704. However, other combinations of phase shift can be used in other examples. Additional details of an exemplary drive system that may be utilized with the semi-resonant actuator device 704 are provided in U.S. Pat. Nos. 8,698,374; 8,450,905; 8,304,960; and 8,299,733, the disclosures of which are hereby incorporated herein by reference in their entireties.

One example of a drive circuit that may be utilized for the full-bridge switching drive electronics 722(1) and 722(2) of the present technology is the NSD2101 Driver IC from ams (Austria). However, other IC's and drive circuits may be used with the present technology. The frequency of the drive signal from the drive circuits is selected based on the application requirements. For example, to achieve lower speed and more precise stepping, the drive frequency should be slightly less than the first bending resonant frequency of structure 703 for the bending mode with a direction substantially perpendicular to the direction of motion. To achieve higher speed and larger steps the drive frequency should be slightly greater than the first bending resonant frequency of the substantially elongated rectangular and monolithic structure 703 for the bending mode with a direction substantially parallel to the direction of motion. Drive frequencies between the two bending mode resonant frequencies of the substantially elongated rectangular and monolithic structure 703 should be avoided due to unstable performance of speed and direction.

Figure 4C:
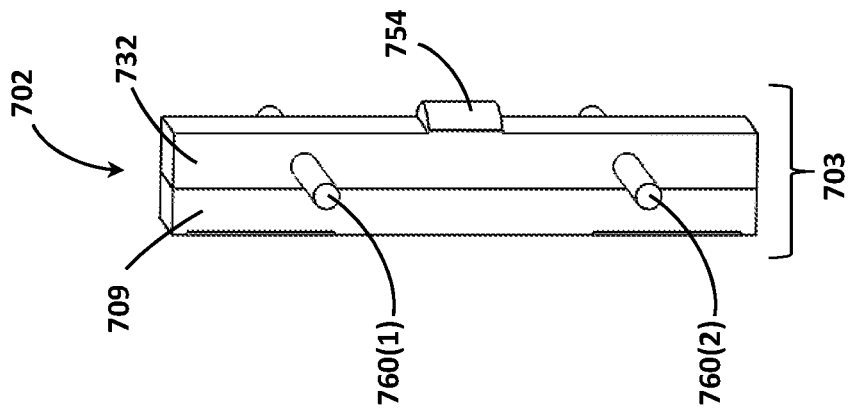
FIG. 4C shows mounting bosses located at the node planes of the semi-resonant actuator assembly illustrated in FIGS. 1A-1E.
Figure 4B:
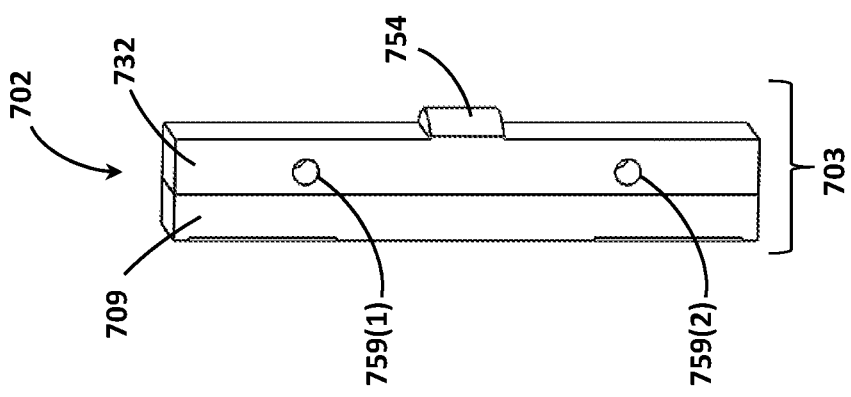
FIG. 4B shows mounting holes located at the node planes of the semi-resonant actuator assembly illustrated in FIGS. 1A-1E.
Figure 4A:
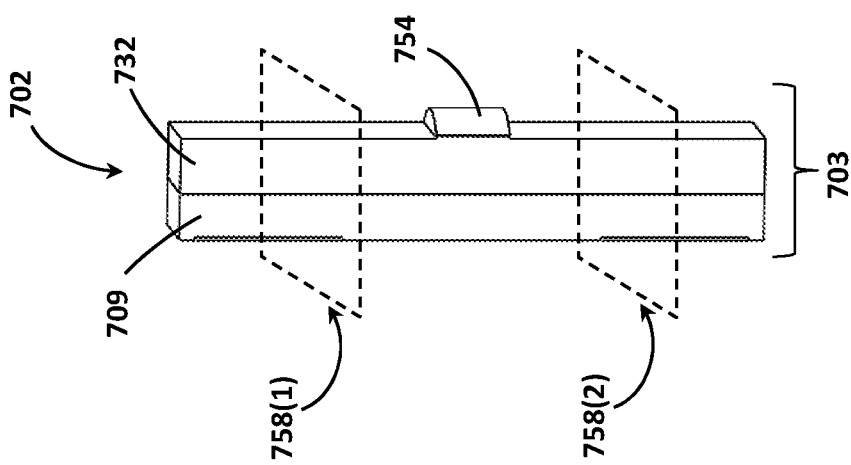
FIG. 4A shows the node mounting planes of the semi-resonant actuator assembly illustrated in FIGS. 1A-1E.

Referring now more specifically to FIG. 4A, in this example, the semi-resonant actuator assembly 702 is held at locations on nodal planes 758(1) and 758(2) to minimize vibration damping and maximize vibration amplitude at the frictional bump 754 at the anti-node, although other configurations may be employed to provide other benefits. Various mechanisms may be employed to hold the semi-resonant actuator assembly 702 at the nodal planes 758(1) and 758(2). Referring to FIG. 4B, in one example, the semi-resonant actuator assembly 702 includes two holes 759(1) and 759(2) located at the nodal planes in the inactive component 732 to simplify assembly and manufacturing and to allow the semi-resonant actuator assembly 702 to be held at the locations on the nodal planes 758(1) and 758(2) as shown in FIG. A. Referring to FIG. 4C, in another example, the actuator assembly 702 includes two bosses 760(1) and 760(2) at the nodal planes in the inactive component 732 to simplify assembly and manufacturing and to allow the semi-resonant actuator assembly 702 to be held at locations on the nodal planes 758(1) and 758(2) as shown in FIG. 4A.

Figure 5A:
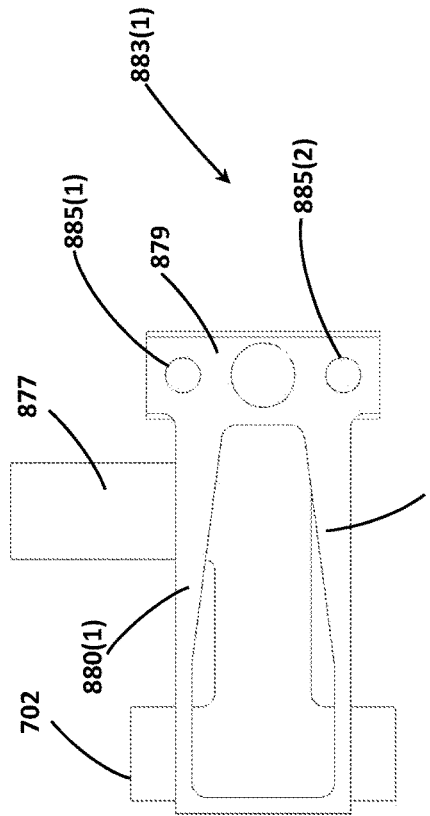
FIGS. 5A-5C are a back view, a side view, and a front view, respectively, of an actuator mechanism including one semi-resonant actuator assembly, a flexible circuit board, and a preload spring in a flat state.
Figure 5B:
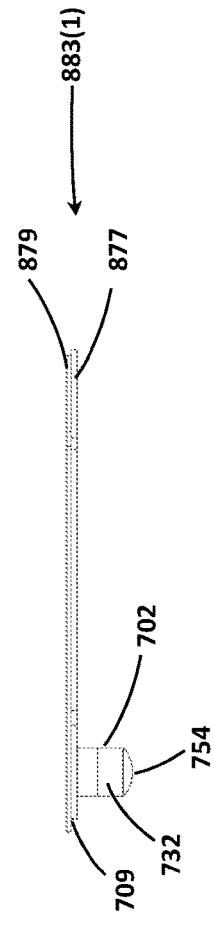
Figure 5C:
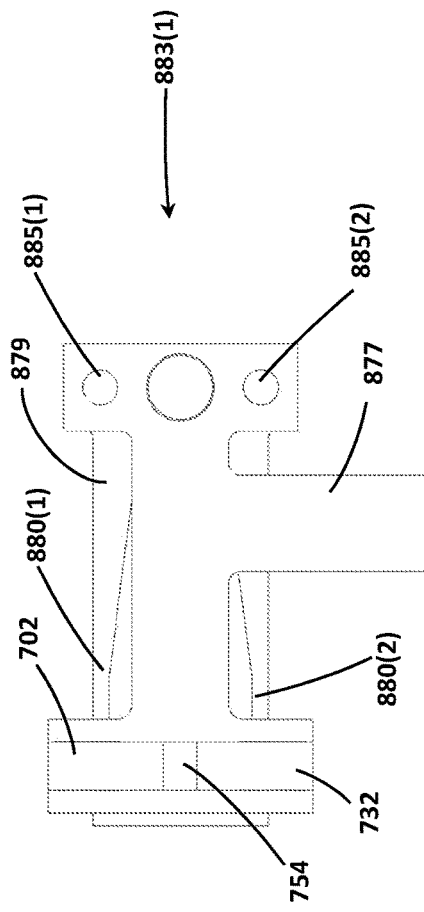

FIGS. 5A-5C illustrate an exemplary actuator mechanism 883(1) that includes a single semi-resonant actuator assembly 702 connected to a flex circuit board 877 and a preload spring 879, although the actuator mechanism may include other types and/or numbers of elements, systems, or devices in other configurations. In this example, the external electrodes 714(1), 714(2), 716(1), and 716(2) of the semi-resonant actuator assembly 702, as shown in FIG. 1A, are soldered to the flex circuit board 877, which is coupled to the piezoelectric plate 709. The external electrodes 714(1), 714(2), 716(1), and 716(2) are all positioned in one plane which allows high-speed surface mount technology (SMT) to be used to manufacture the flex circuit board 877, although other soldering process or other electrical connection methods may be employed.

In this example, the preload spring 879 is made of a thin sheet metal, although other materials may be utilized. The preload spring 879 is bonded with the back of the flex circuit board 877. The bonding can be done simultaneous during the SMT process or by other means. The preload spring 879 includes branches 880(1) and 880(2) that are fixed to the semi-resonant actuator assembly 702 at the nodal planes 758(1) and 758(2), as shown in FIG. 4A. Holes 885(1) and 885(2) on the preload spring 879 provide a fixed point used to mount the actuator mechanism 883(1) into a larger mechanism or system, although other mounting configurations may be employed. As shown in FIGS. 5A-5C, the actuator mechanism 883(1) is assembled in a flat plane. The preload spring 879 may then be subsequently formed, such that it is no longer flat, to generate a formed single actuator mechanism 883(2) as shown in FIGS. 6A-6D.

Referring now more specifically to FIGS. 6A-6D, the formed single actuator mechanism 883(2), with the preload spring 879 in a formed configuration that is no longer flat. The formed single actuator mechanism 883(2) achieves a specific distance s0 between the frictional bump 754 and the mounting plane around the two mounting holes 885(1) and 885(2). This pre-formed offset s0 is used to achieve a specific bending force of the preload spring 879, preload frictional bump 754, and provide a specific orientation of the semi-resonant actuator assembly 702 when mounted into a rotary or linear motion mechanism.

Referring now to FIGS. 7A-7D, a linear motion mechanism 751 that uses the pre-formed actuator mechanism 883(2) is illustrated. The linear motion mechanism 751 includes a moving linear slide 864 is guided by two straight pins 868(1) and 868 (2). The pins 868(1) and 868(2) are mounted on a fixed base 869, although other configurations for the linear motion mechanism 751 may be contemplated. In this example, the linear slide 864 can move along axis 865 in directions 866. However, other linear guide bearing methods may be employed using the pre-formed actuator mechanism 883(2) of the present technology.

In this example, the formed actuator mechanism 883(2) is held at the holes 885(1) and 885(2) on the fixed based 869 of the linear motion mechanism 751. Note the distance s1 between the frictional bump 754 and the plane of mounting holes 885(1) and 885(2) is smaller than the distance s0 shown in FIG. 6B. In this example, the preload spring 879 generates a clamping force between the linear slide 864 and the frictional bump 754. The clamping force direction is perpendicular to the moving direction 866 of the linear slide 864. The clamping force is directly supported by the pins 868(1) and 868(2).

An exemplary operation of the linear motion mechanism 751 will now be described with respect to FIGS. 1A-7D. The semi-resonant actuator assembly 702 is operated in semi-resonant mode when the drive signals, as shown in FIG. 3, are applied using the semi-resonant actuator device 704 as shown in FIG. 2. The elliptical motion of the frictional bump 754 generates a frictional drive force at the contact point between the frictional bump 754 and the linear slide 864. The frictional drive force pushes the linear slide 864 along the moving direction 866. In this example, a magnetic position sensing mechanism including a magnet 980 and a magnetic sensor 981 is employed. The magnet 980 is attached on the linear slide 864, such that the change in magnetic field with motion along the moving direction 866 is detected by the magnetic sensor 981. One example of a magnetic sensor that may be employed as the magnetic sensor 981 is the AS5510 from ams (Austria), although other magnetic sensors may be utilized. Although a magnetic position sensing mechanism is described, it is to be understood that other position sensing mechanisms can be used with the present technology, including capacitive and optical positioning sensing mechanisms, by way of example only.

Referring now to FIGS. 8A-8D an exemplary rotary motion mechanism 752 that uses the formed single actuator mechanism 883(2) is illustrated. The rotatory motion mechanism 752 includes a rotor 889 that is guided by two rotational bearings 895(1) and 895(2), although other rotary motion mechanism configurations may be contemplated. The rotational bearings 885(1) and 885(2) are mounted on a solid fixed base 884. The rotor 889 rotates around rotational axis 887 along direction 886. The formed actuator mechanism 883(2) is held at holes 885(1) and 885(2) on the fixed base 884. The frictional bump 754 presses on the rotor 889 at surface 890 of the rotor 889. The surface 890 is spherical, although other shapes for the surface 890 of the rotor 889 may be utilized.

Figure 6A:
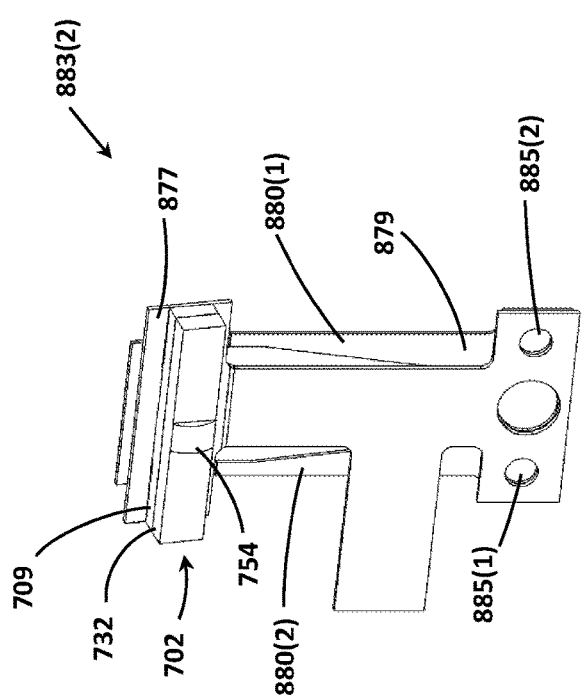
FIGS. 6A-6D are an end view, a side view, a back view, and a perspective view of the actuator mechanism as illustrated in FIG. 5A-5C with the sheet metal spring pre-formed in a non-flat shape.
Figure 6D:
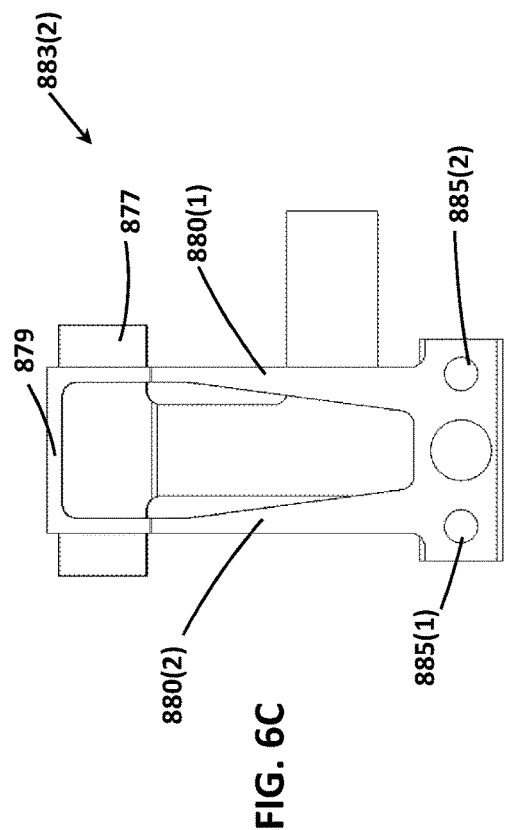
Figure 6B:
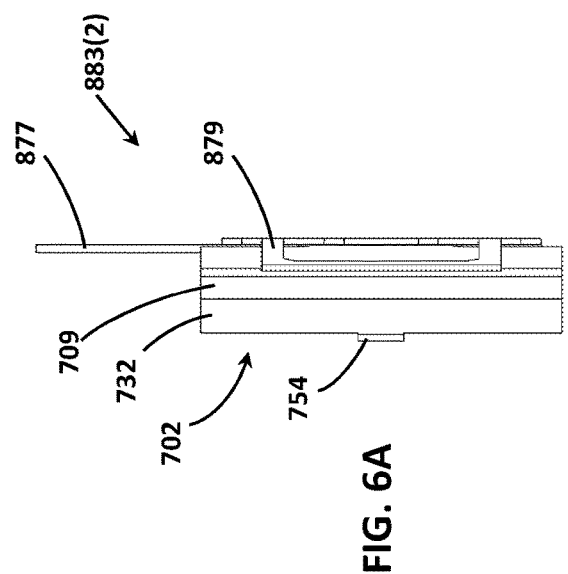
Figure 6C:
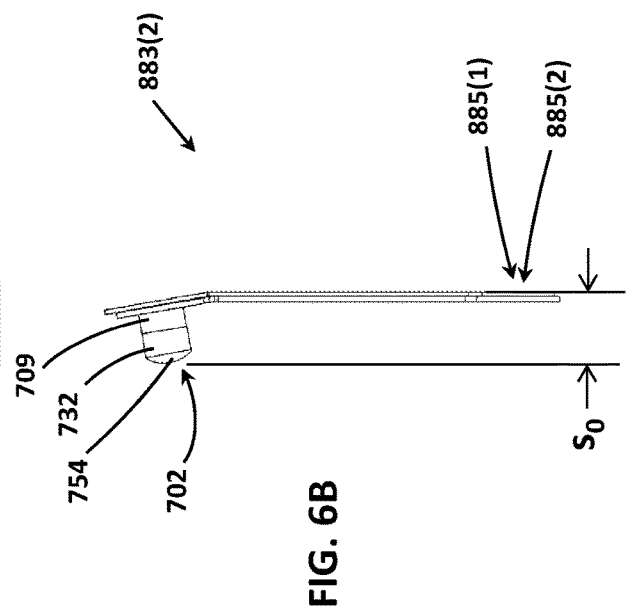
Figure 7A:
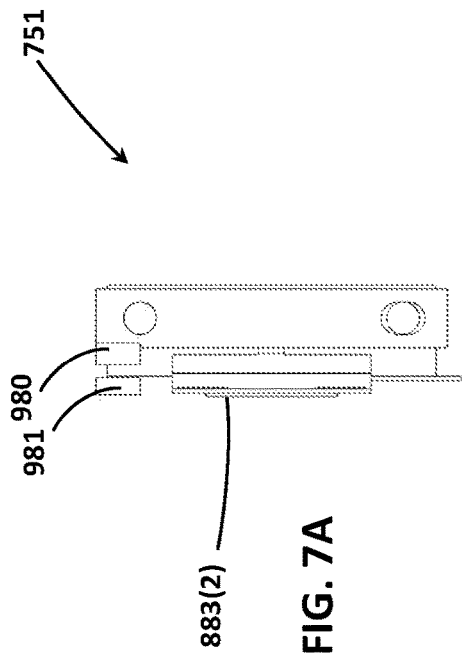
FIGS. 7A-7D are an end view, a side view, a back view, and a perspective view, respectively, of a linear motion mechanism using the actuator mechanism illustrated in FIGS. 6A-D and also incorporating a linear guide bearing and position sensor.
Figure 7B:
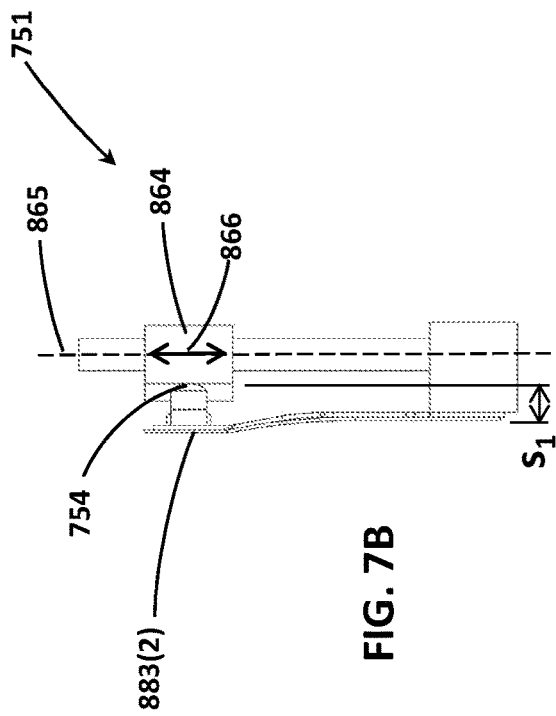
Figure 7C:
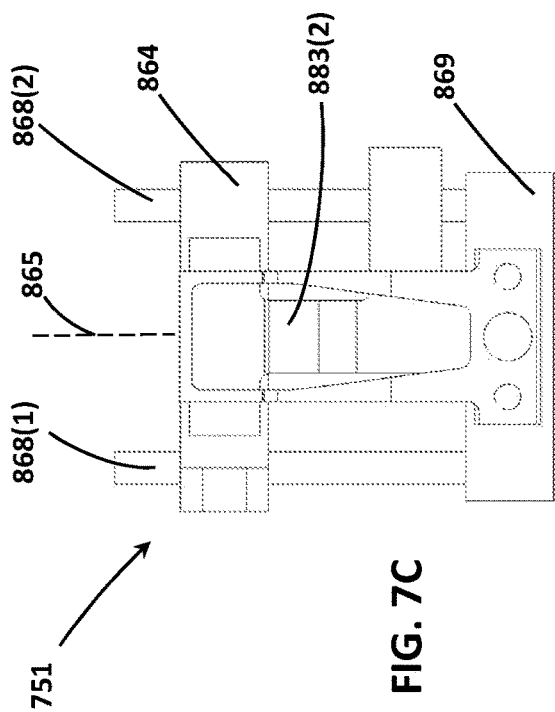
Figure 7D:
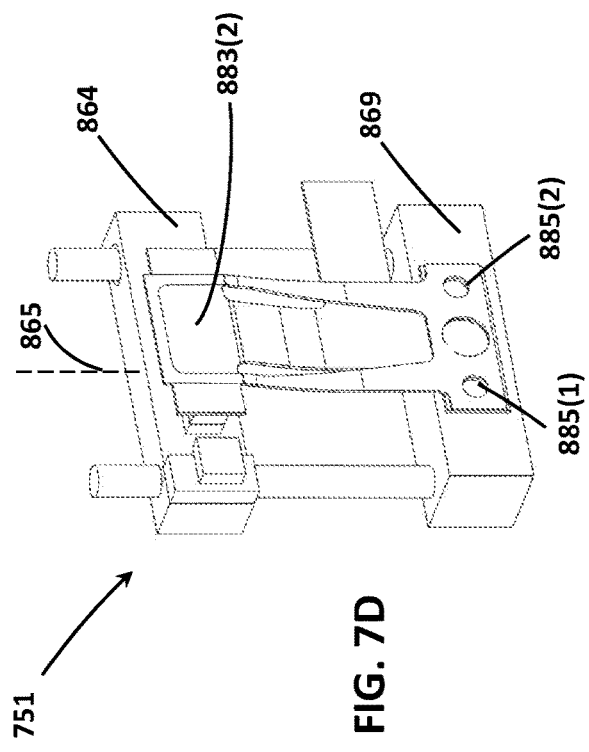
Figure 8A:
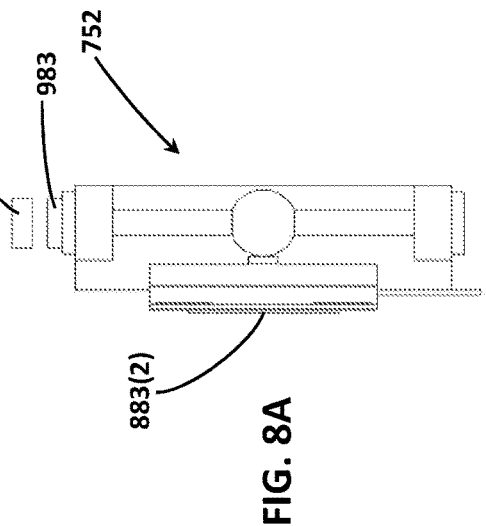
FIGS. 8A-8D are an end view, a side view, a back view, and a perspective view, respectively, of a rotary motion mechanism employing the actuator system illustrated in FIGS. 6A-6D and also incorporating a rotating shaft and angle sensor.
Figure 8B:
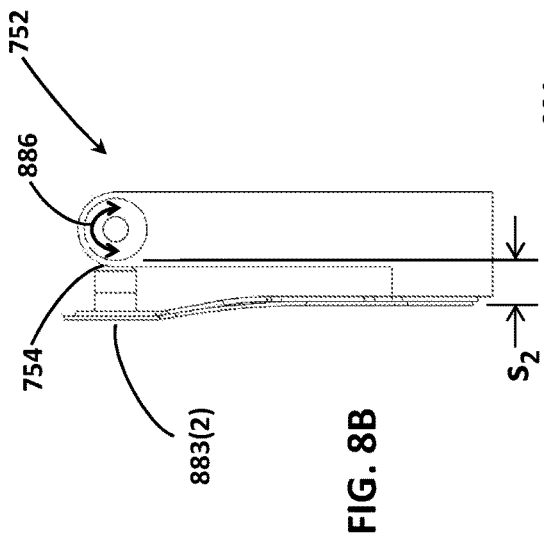
Figure 8C:
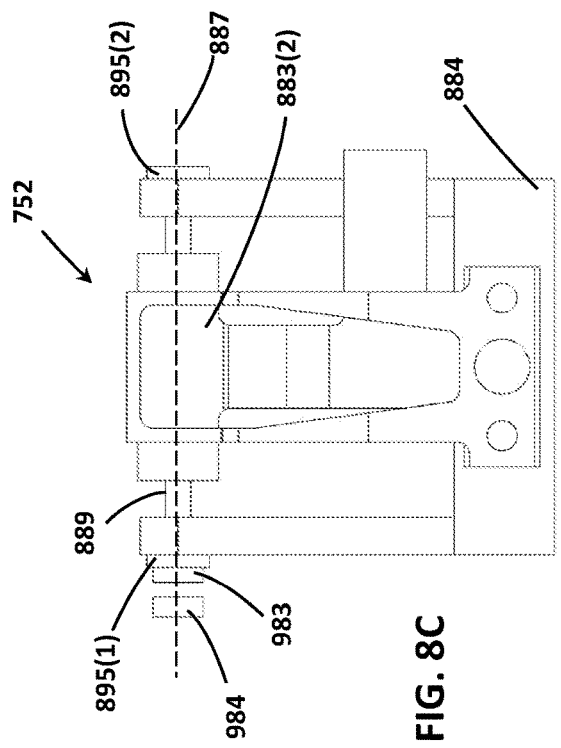
Figure 8D:
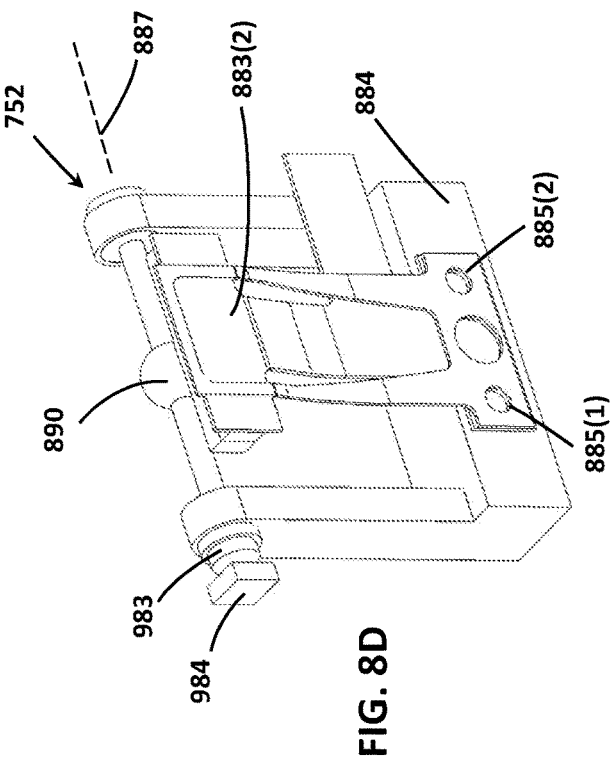

In this example, the distance s2 between the frictional bump 754 and the plane of the mounting holes 885(1) and 885(2) is smaller than the distance s0 shown in FIG. 6B. Thus, the preload spring 879 generates a clamping force between the surface 890 and the frictional bump 754. The clamping force direction is perpendicular to the rotational axis 887 and also perpendicular to the tangential relative velocity between the frictional bump 754 and the surface 890. The clamping force is supported by the bearings 895(1) and 895(2).

An exemplary operation of the rotary motion mechanism 752 will now be described with respect to FIGS. 1A-6C and 8A-8D. The semi-resonant actuator assembly 702 operates in semi-resonant mode when the signals shown in FIG. 3 are applied using the semi-resonant actuator device 704 as shown in FIG. 2. The elliptical trajectory of the frictional bump 754 generates a tangential drive force at the contact point between the frictional bump 754 and the surface 890. The frictional drive force rotates the rotor 889 around the rotational axis 887 and in the direction 886. In this example, a magnetic position sensing mechanism including a magnet 983 and a magnetic sensor 984 is employed. The magnet 983 is attached on the rotor 889. The change in magnetic field as the magnet 983 rotates is detected by the magnetic sensor 984. One example of a magnetic sensor that may be employed as the magnetic sensor 984 is the AS5510 from ams (Austria), although other magnetic sensors may be utilized. Although a magnetic position sensing mechanism is described, it is to be understood that other position sensing mechanisms can be used with the present technology, including capacitive and optical positioning sensing mechanisms, by way of example only.

Figure 9A:
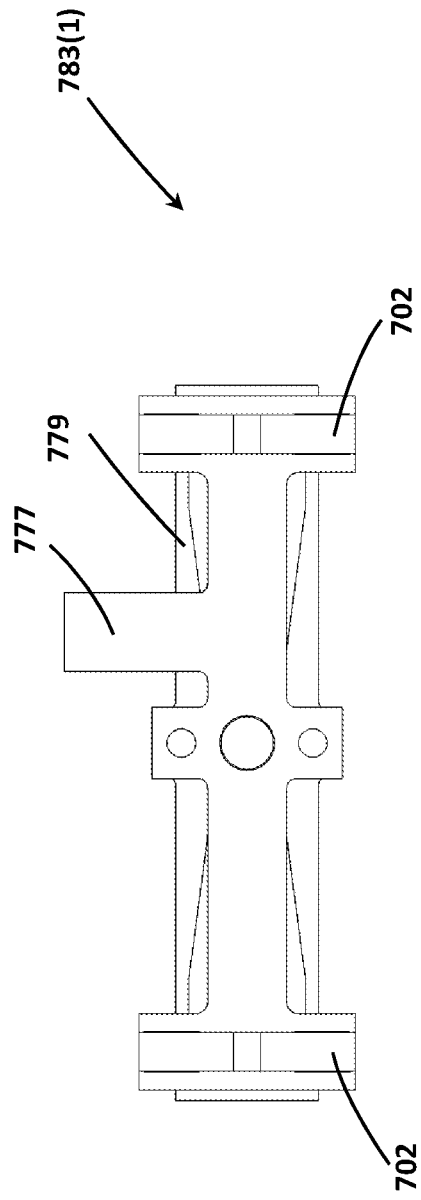
FIGS. 9A-9C are a side view, an end view, a back view, respectively, of a two-actuator mechanism using two semi-resonant actuator assemblies, a flexible circuit board and preload spring in a flat state.
Figure 9B:
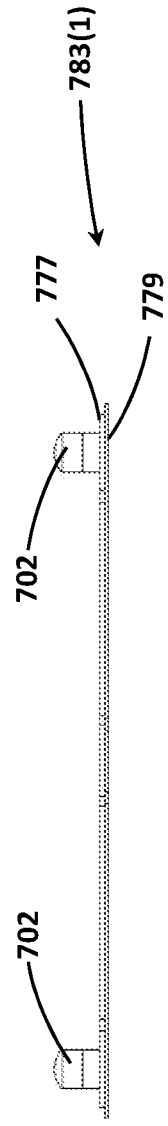
Figure 9C:
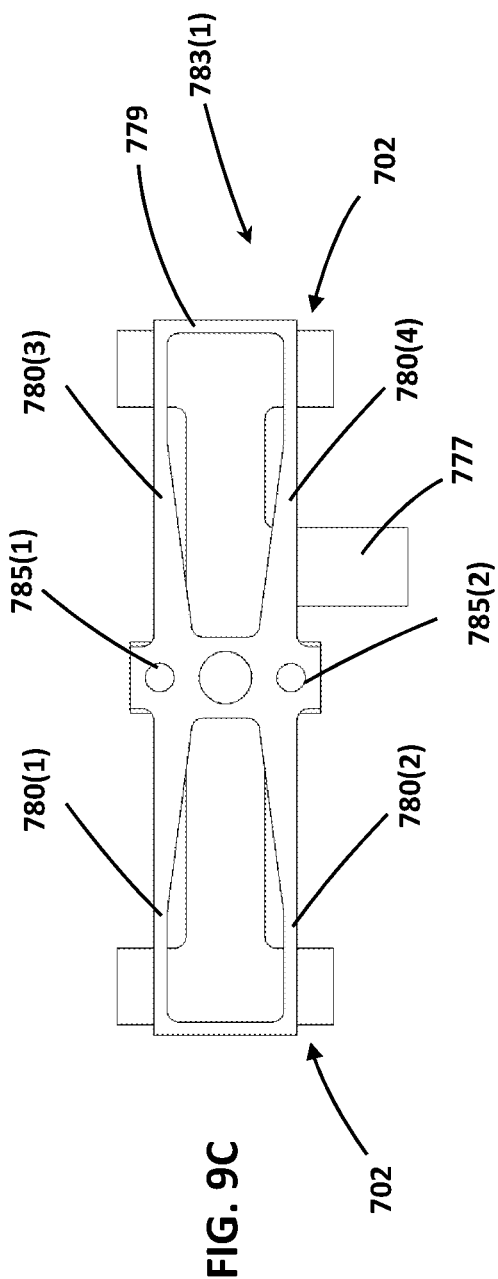

Referring now to FIGS. 9A-9C, a two-actuator mechanism 783(1) including two separate actuator assemblies 702 connected to a flex circuit board 777 and a preload spring 779 is illustrated. In this example, the external electrodes 714(1), 714(2), 716(1), and 716(2), as shown in FIG. 1A, of the two actuator assemblies 702 are SMT soldered to the flex circuit board 777 as described above. The preload spring 779 is made of a thin sheet metal, however, other materials may be utilized for the preload spring 779. The preload spring 779 is bonded to the flex circuit board 777 during the solder re-flow process, although other bonding techniques may be utilized. The preload spring 779 includes branches 780(1)-780(4) that contact node planes 758(1) and 758(2) of the semi-resonant actuator assemblies 702. The holes 785(1) and 785(2) on the preload spring 779 are used for mounting the device into either a rotary or a linear motion mechanism, by way of example only.

Referring now to FIGS. 10A-10D, an exemplary method of making the formed two-actuator mechanism 783(2) will be described. The two-actuator mechanism 783(1) is first assembled in a single plane, as shown in FIGS. 9A-9D, for ease of manufacturing. Subsequently the preload spring 779 is pre-formed into a "U" shape with a specific distance d0 between the two frictional bumps 754 on the semi-resonant actuator assemblies 702 to create the formed two-actuator mechanism 783(2).

Referring now more specifically to FIGS. 11A-11D, an exemplary two-actuator linear motion mechanism 761 that uses the two-actuator mechanism 783(2) is illustrated. A moving linear slide 764 is guided by two straight pins 768(1) and 768(2). The pins 768(1) and 768(2) are mounted on a solid fixed base 769. The linear slide 764 can move along linear axis 765 along direction 766. However, the linear slide 764 can also be guided by other types of linear bearings.

The two-actuator mechanism 783(2) is held at the plane of holes 785(1) and 785(2) on the fixed base 769. The two frictional bumps 754 clamp on both sides of the linear slide 764. The distance d1 between the two frictional bumps 754 is bigger than the distance d0 shown in FIG. 10B. The preload spring 779 generates a clamping force between the slide 764 and the frictional bumps 754. The clamping force directions of frictional bumps 754 are perpendicular to the moving direction 766 and are substantially equal in magnitude but opposite in direction. Thus, the net clamping force that is supported by the pins 768(1) and 768(2) that guide the linear slide 764 are substantially zero, which reduces friction losses and improves efficiency.

An exemplary operation of the linear motion mechanism 761 will now be described with respect to FIGS. 9A-11D. When the two semi-resonant actuator assemblies 702 are operated in semi-resonant mode, the elliptical trajectories of the frictional bumps 754 result in frictional drive forces at the contact points between the frictional bumps 754 and the linear slide 764. The frictional drive forces push the linear slide 764 along the moving direction 766. In this example, a magnetic position sensing mechanism including a magnet 790 and a magnetic sensor 791 is employed. The magnet 790 is attached on the linear slide 764. The magnetic field from the magnet 790 changes with movement of the linear slide 764 and is detected by the magnetic sensor 791. One example of a magnetic sensor that may be employed is the AS5510 from ams (Austria), although other magnetic sensors may be utilized. Although a magnetic position sensing mechanism is described, it is to be understood that other position sensing mechanisms can be used with the present technology, including capacitive and optical positioning sensing mechanisms, by way of example only.

Figure 11A:
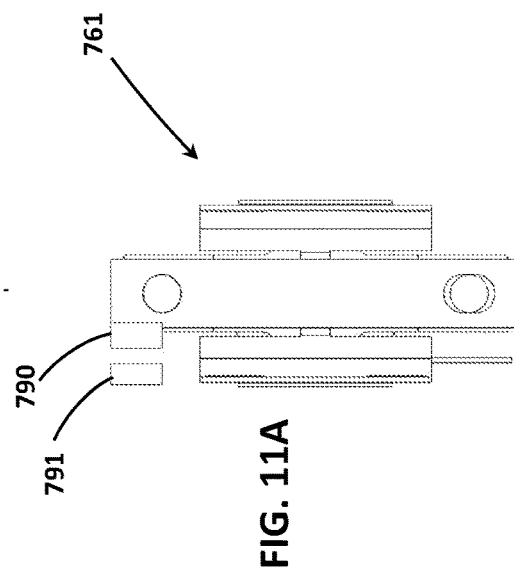
FIGS. 11A-11D are an end view, a side view, a back view, and a perspective view, respectively, of a linear motion mechanism using the two-actuator mechanism illustrated in FIGS. 10A-10D and also incorporating linear bearings and position sensor.
Figure 11B:
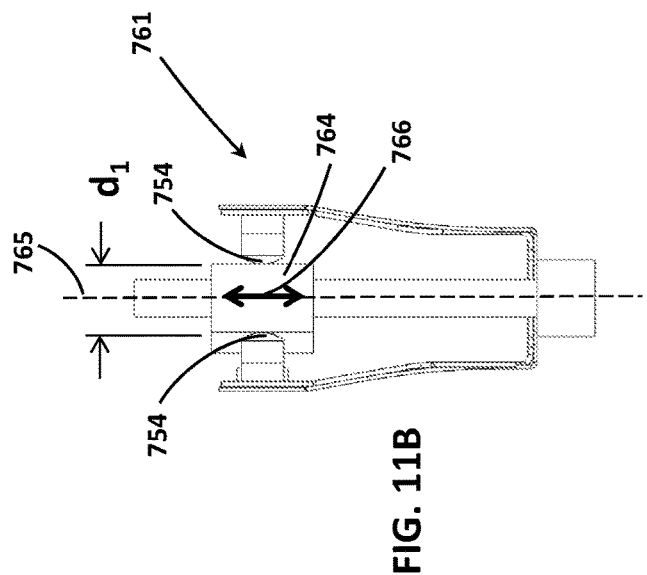
Figure 11C:
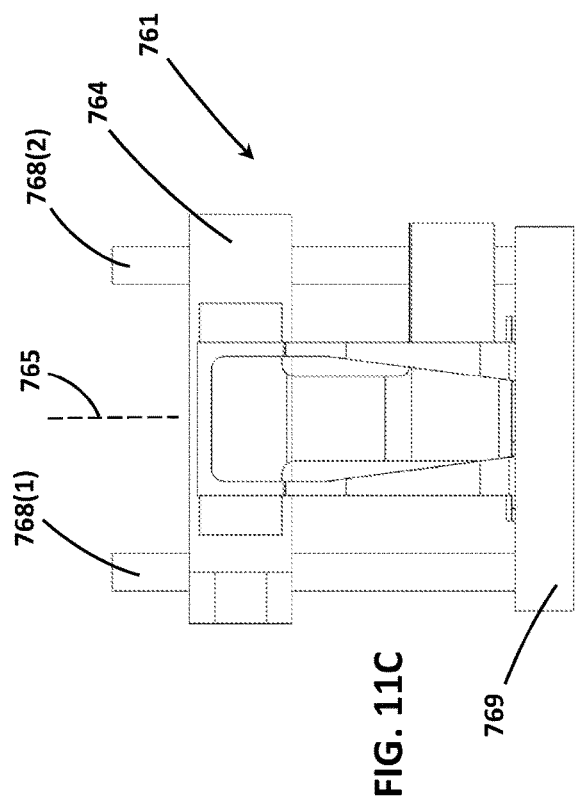
Figure 11D:
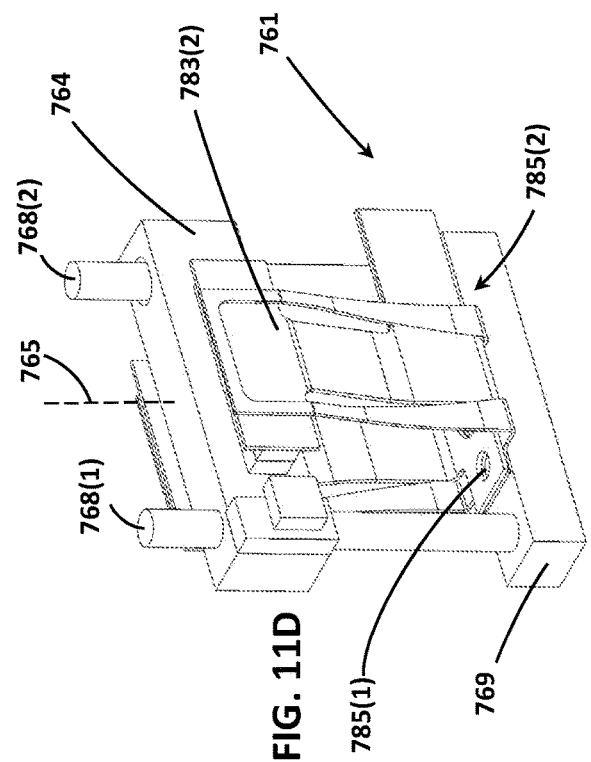
Figure 11E:
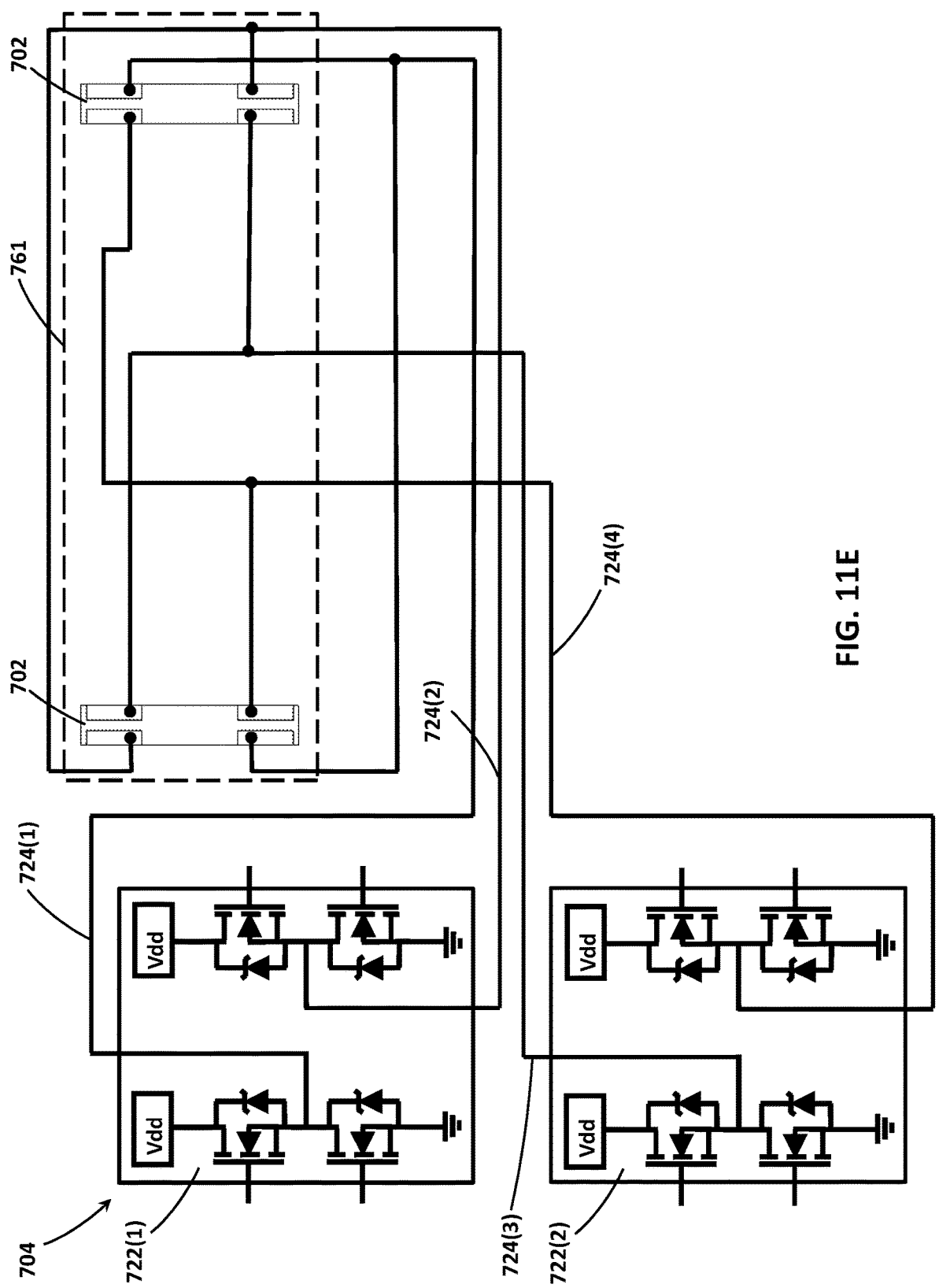
FIG. 11E is a schematic diagram for the linear motion system using a two-actuator linear motion mechanism as illustrated in FIGS. 11A-11D.

Referring now to FIG. 11E, a schematic diagram for the two-actuator, linear motion system is shown that integrates two-actuator linear motion mechanism 761 and drive electronics 722(1) and 722(2). The details of the two-actuator linear motion mechanism 761 are not shown in order to highlight the method of electrical connection of the two semi-resonant actuator assemblies 702.

The two semi-resonant actuator assemblies 702 are driven in parallel such that the drive forces of each semi-resonant actuator assembly 702 add together at the linear slide 764. This additive force is achieved when the two semi-resonant actuator assemblies 702 generate two elliptical trajectories at their respective frictional bumps 754 that are in opposite rotational directions, and correspondingly they generate drive force in the same direction.

FIGS. 12A-12D illustrate a rotary motion mechanism 762 that uses the two-actuator mechanism 783(2). A rotor 789 is guided by two rotational bearings 795(1) and 795(2). The bearings 795(1) and 795(2) are mounted on a fixed base 784. The rotor 789 rotates around rotational axis 787 along direction 786. The two-actuator mechanism 783(2) is held at the plane of holes 785(1) and 785(2) on the fixed base 784. The two frictional bumps 754 clamp on the rotor 789 on the surface 790. The surface 790 is spherical in shape, however, other shapes for the surface 790 may be utilized.

Figure 10A:
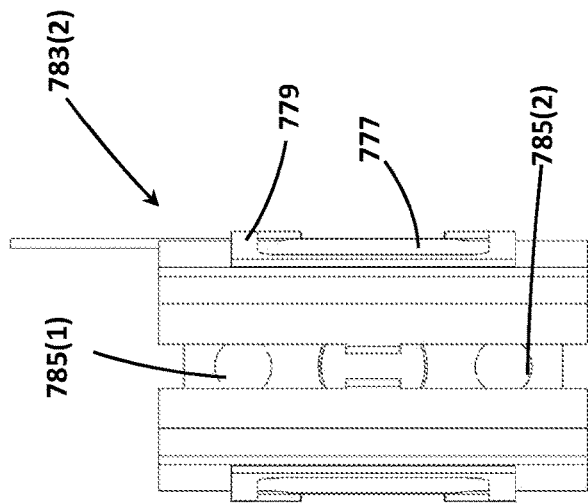
FIGS. 10A-10D are an end view, a side view, a back view, and a perspective view, respectively, of the two-actuator mechanism as illustrated in FIGS. 9A-9C with its sheet metal spring pre-formed in a "U" shape.
Figure 10B:
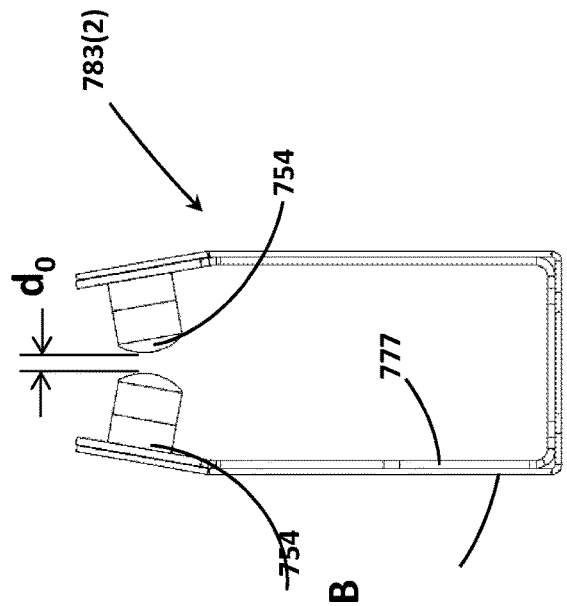
Figure 10D:
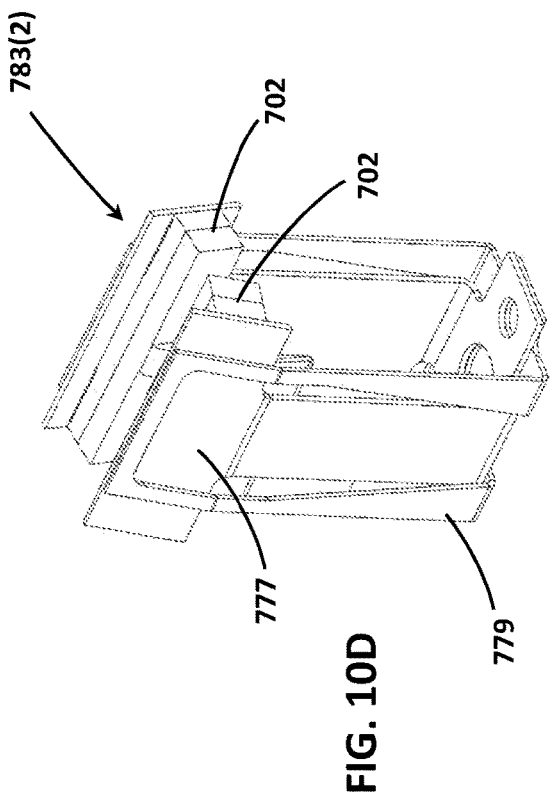
Figure 10C:
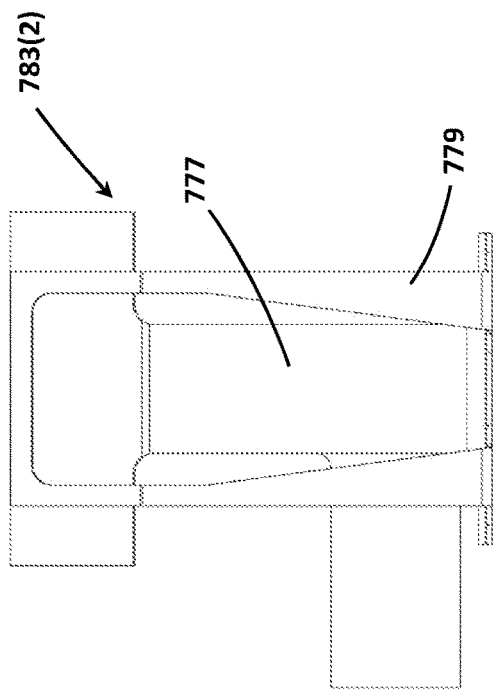

The distance d2 between the two frictional bumps 754 is bigger than the distance d0, shown in FIG. 10B. Thus, the preload spring 779 generates clamping forces between the two frictional bumps 754 and the surface 790. The clamping force direction is perpendicular to the rotational axis 787 and also perpendicular to the tangential relative velocity between the two frictional bumps 754 and the surface 790. The clamping forces of the frictional bumps 754 are substantially equal in magnitude but opposite in direction. Thus, the net clamping force that is supported by the rotary bearings 795(1) and 795(2) is substantially zero, which reduces friction losses and improves efficiency.

An exemplary operation of the rotary motion mechanism 752 will now be described with respect to FIGS. 9A-10D and 12A-12D. When the two semi-resonant actuator assemblies 702 are operated in semi-resonant modes, the elliptical trajectories of the two frictional bumps 754 generate tangential frictional forces at the contact points between the two frictional bumps 754 and the surface 790. The frictional forces rotate the rotor 789 around the rotational axis 787 and in the direction 786. In this example, a magnetic position sensing mechanism including a magnet 793 and a magnetic sensor 794 is employed. The magnet 793 is attached on the rotor 789. The magnetic field changes as the magnet 793 rotates around the rotational axis 787 and is detected by the magnetic sensor 794. One example of a magnetic sensor that may be employed is the AS5510 from ams (Austria), although other magnetic sensors may be utilized. Although a magnetic position sensing mechanism is described, it is to be understood that other position sensing mechanisms can be used with the present technology, including capacitive and optical positioning sensing mechanisms, by way of example only.

Figure 12A:
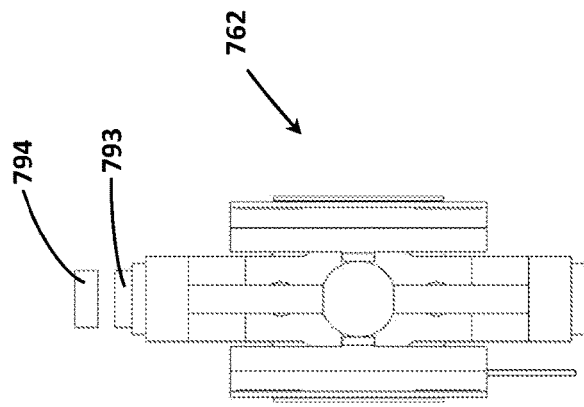
FIGS. 12A-D are an end view, a side view, a back view, and a perspective view of a rotary motion mechanism using the two-actuator mechanism illustrated in FIGS. 10A-10D and also incorporating a rotating shaft and angle sensor.
Figure 12B:
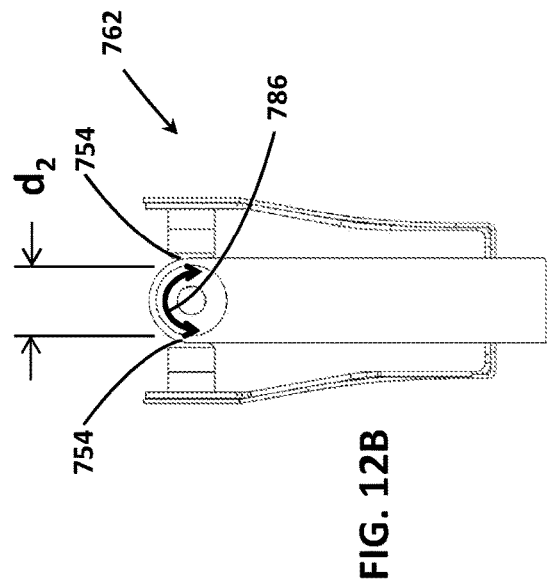
Figure 12C:
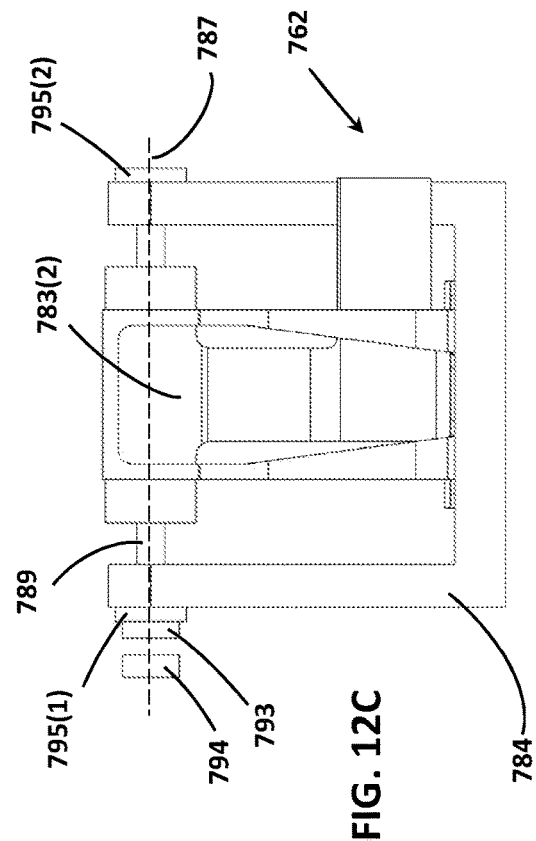
Figure 12D:
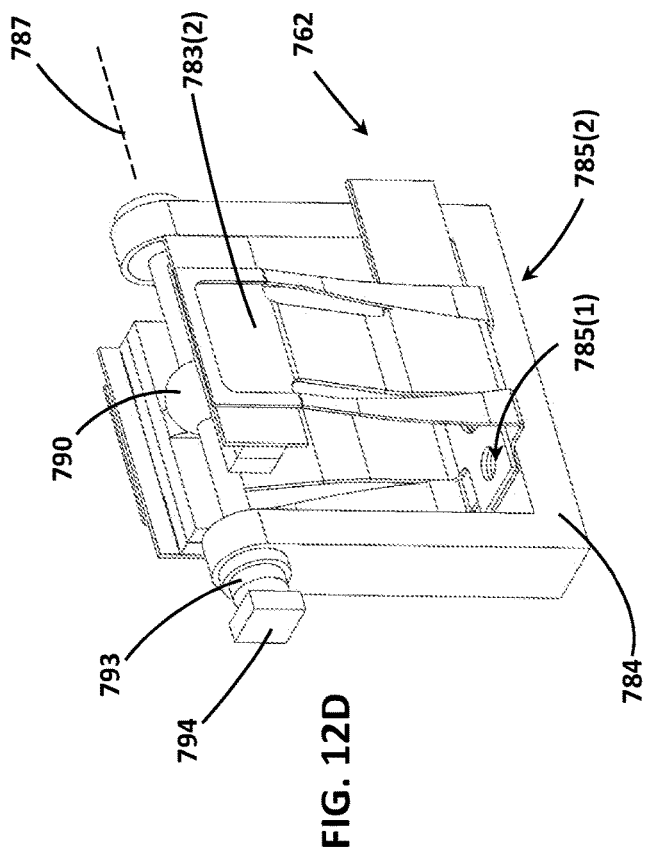
Figure 12E:
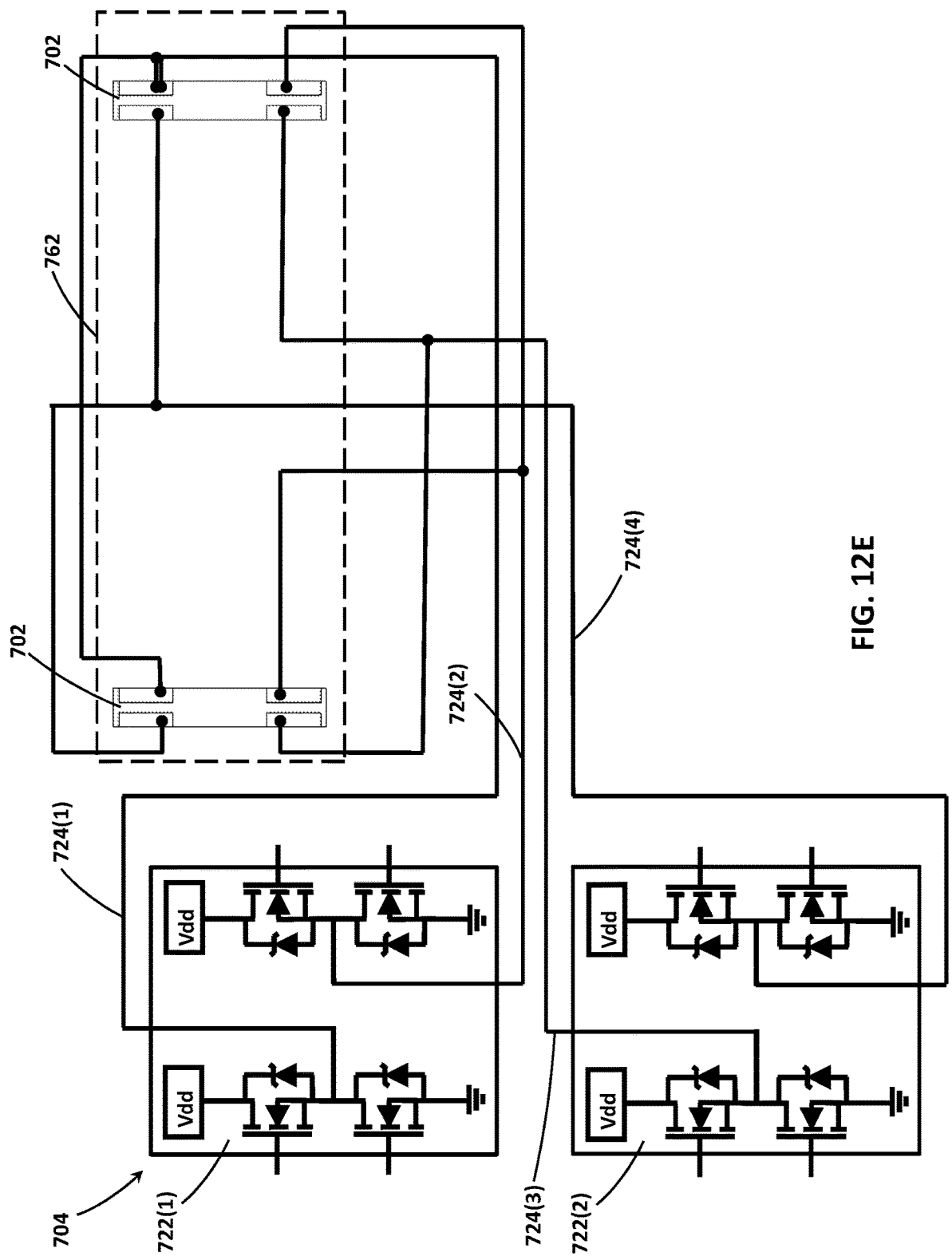
FIG. 12E is a schematic diagram for the rotary motion system using a two-actuator rotary motion mechanism as illustrated in FIG. 12A-12D.

Referring now to FIG. 12E, a schematic diagram for the two-actuator rotary motion system is shown that integrates the two-actuator rotary motion mechanism 762 and drive electronics 722(1) and 722(2). The details of two-actuator rotary motion mechanism 762 are not shown in order to highlight the method of electrical connection of the two semi-resonant actuator assemblies 702. The two semi-resonant actuator assemblies 702 are driven in parallel such that the drive torques of each semi-resonant actuator assembly 702 add together at the surface 790. This additive torque is achieved when the two semi-resonant actuator assemblies 702 generate two elliptical trajectories at their respective frictional bumps 754 that are in the same rotational directions, and correspondingly they generate additive torque on opposite sides of the rotor 789.

Linear motion mechanism 761 and rotary motion mechanism 762 use a two-actuator mechanism 783(2), while linear motion mechanism 751 and rotary motion mechanism 752 use a single actuator mechanism 883(2). The two-actuator mechanisms 761 and 762 are bigger and consume more power than those of the motion mechanisms 751 and 752 and also produce more force and torque. Additional benefits of the two-actuator mechanisms include balanced clamping forces on the moving linear slide 764 and the rotor 789. The balanced forces produce near zero lateral forces on the linear guide pins 768(1) and 768(2) and the rotary bearings 795(1) and 795(2). If the single actuator mechanisms are used the linear and rotary bearings must have very low friction to achieve sufficient force and torque.

Accordingly, the present technology provides a number of advantages including providing semi-resonant motion devices that are easier to manufacture and are more efficient.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A semi-resonant actuator assembly comprising:
 a resonating body comprising:
  a single piezoelectric plate having a first length, a first width, and a first thickness, the piezoelectric plate having two independent active areas with corresponding external electrodes located on a single exterior surface of the piezoelectric plate; and
  an inactive plate having a second length substantially equal the first length, a second width substantially equal to the first width, and a second thickness, wherein a resonating body thickness of the resonating body is provided by a sum of the first thickness of the active piezoelectric plate and the second thickness of the inactive plate.

2. The semi-resonant actuator assembly as set forth in claim 1, wherein the inactive plate is bonded to the piezoelectric plate.

3. The semi-resonant actuator assembly as set forth in claim 1, wherein the inactive plate is formed from an inactive ceramic that is co-fired with the piezoelectric plate.

4. The semi-resonant actuator assembly as set forth in claim 1 further comprising:
 at least one friction bump at an anti-node plane of the resonating body.

5. The semi-resonant actuator assembly as set forth in claim 1, wherein the resonating body is rectangular in shape.

6. A semi-resonant actuator device comprising:
 a semi-resonant actuator assembly comprising:
  a resonating body comprising:
   a single piezoelectric plate having a first length, a first width, and a first thickness, the piezoelectric plate having two independent active areas with corresponding external electrodes located on a single exterior surface of the piezoelectric plate; and
   an inactive plate having a second length substantially equal the first length, a second width substantially equal to the first width, and a second thickness, wherein a resonating body thickness of the resonating body is provided by a sum of the first thickness of the active piezoelectric plate and the second thickness of the inactive plate; and
  a two-phase drive circuit operably coupled to the piezoelectric plate of the semi-resonant actuator assembly.

7. The semi-resonant actuator device as set forth in claim 6, wherein the two-phase drive circuit is operably coupled to the at least two independent active areas of the piezoelectric plate.

8. The semi-resonant actuator device as set forth in claim 7, wherein the two-phase drive circuit comprises two full-bridge switching electronic circuits configured to produce two drive signals.

9. The semi-resonant actuator device as set forth in claim 8, wherein the two full-bridge switching electronic circuits are configured to produce the two drive signals having adjustable frequency, phase, pulse width, and amplitude.

10. The semi-resonant actuator device as set forth in claim 7, wherein the two full-bridge switching electronic circuits are configured to produce the two drive signals having a substantially equal frequency, wherein the frequency is less than a first bending resonance of the semi-resonant actuator assembly or greater than a second bending resonance of the semi-resonant actuator assembly.

11. A semi-resonant motion system comprising:
 a semi-resonant actuator assembly comprising:
  a resonating body comprising:
   a single piezoelectric plate having a first length, a first width, and a first thickness, the piezoelectric plate having two independent active areas with corresponding external electrodes located on a single exterior surface of the piezoelectric plate; and
   an inactive plate having a second length substantially equal the first length, a second width substantially equal to the first width, and a second thickness, wherein a resonating body thickness of the resonating body is provided by a sum of the first thickness of the active piezoelectric plate and the second thickness of the inactive plate;

a two-phase drive circuit operably coupled to the piezoelectric plate of the semi-resonant actuator assembly;

a flexible printed circuit board operably coupled to the external electrodes of the piezoelectric plate of the semi resonant actuator assembly and the two-phase drive circuit;

a preload spring positioned to support the semi-resonant actuator assembly; and at least one movable body positioned between the semi-resonant actuator assembly and the at least one moveable body, wherein the preload spring provides a clamping force between the semi-resonant actuator assembly and the at least one movable body and frictionally connects the semi-resonant actuator assembly to the at least one moveable body.

12. The semi-resonant motion system as set forth in claim 11, wherein the semi-resonant actuator assembly, the flexible printed circuit board, and the preload spring are assembled in a single plane using surface mount electronics assembly processes.

13. The semi-resonant motion system as set forth in claim 11 further comprising a second semi-resonant actuator assembly coupled in parallel to the two-phase drive circuit configured to produce vibration ellipses that frictionally engage the movable body such that forces generated by the at least two semi-resonant actuator assemblies substantially add together.

14. The semi-resonant motion device system as set forth in claim 13, wherein the at least one moveable body is a linear movable body and the at least two semi-resonant actuator assemblies are clamped to opposite sides of the linear movable body and the two-phase drive circuit is configured to produce the rotation directions of the vibration ellipses in opposite directions.

15. The semi-resonant motion system as set forth in claim 13, wherein the at least one movable body is rotatable movable body and the at least two semi-resonant actuator assemblies are clamped to opposite sides of a rotatable movable body and the two-phase drive circuit is configured to produce the rotation directions of the vibration ellipses in a same direction.

16. The semi-resonant actuator system as set forth in claim 13, wherein the two full-bridge switching electronic circuits are configured to produce the two drive signals having a substantially equal frequency, wherein the frequency is less than a first bending resonance of the semi-resonant actuator assembly or greater than a second bending resonance of the semi-resonant actuator assembly.

* * * * *